Dec. 23, 1969  A. A. REGEL  3,485,378
ROTARY DRUM FILTER WITH INTERIOR FILTER PANELS
Filed Feb. 23, 1967  7 Sheets-Sheet 5
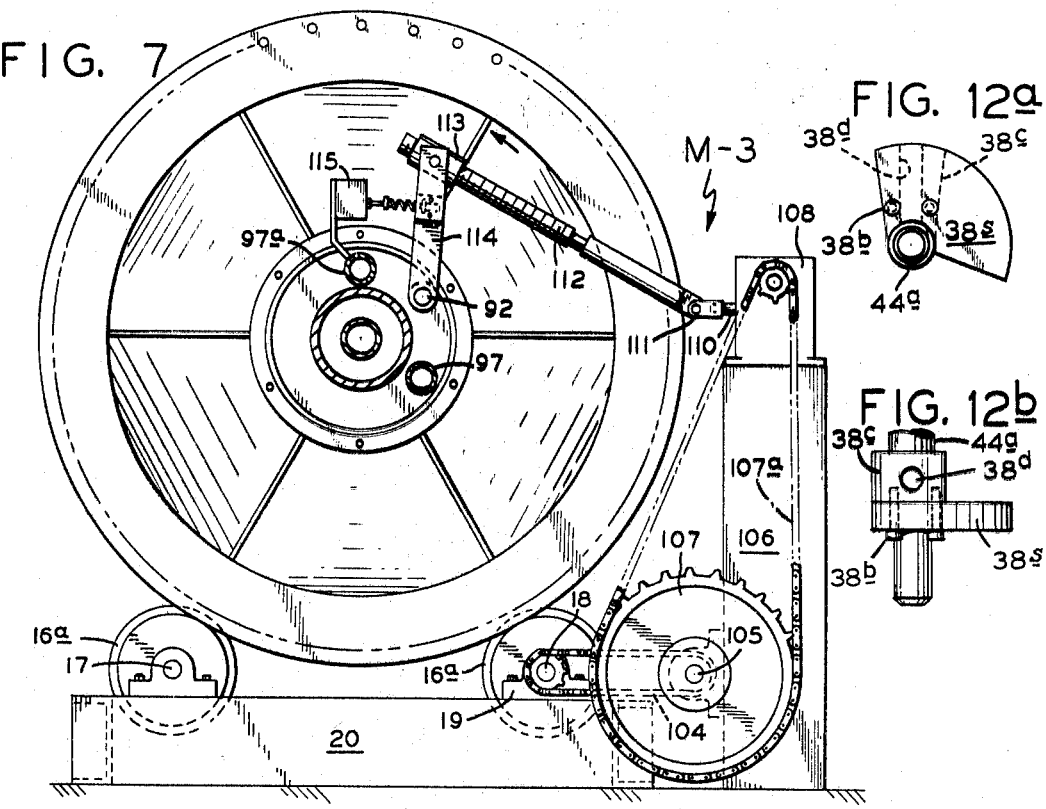
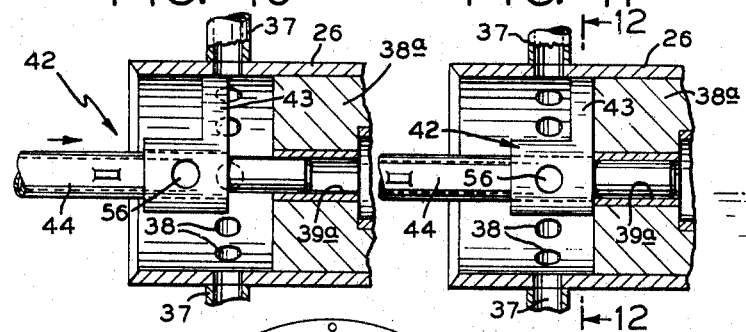
INVENTOR
ARTHUR A. REGEL
BY Theodore M. Jablon
ATTORNEY.

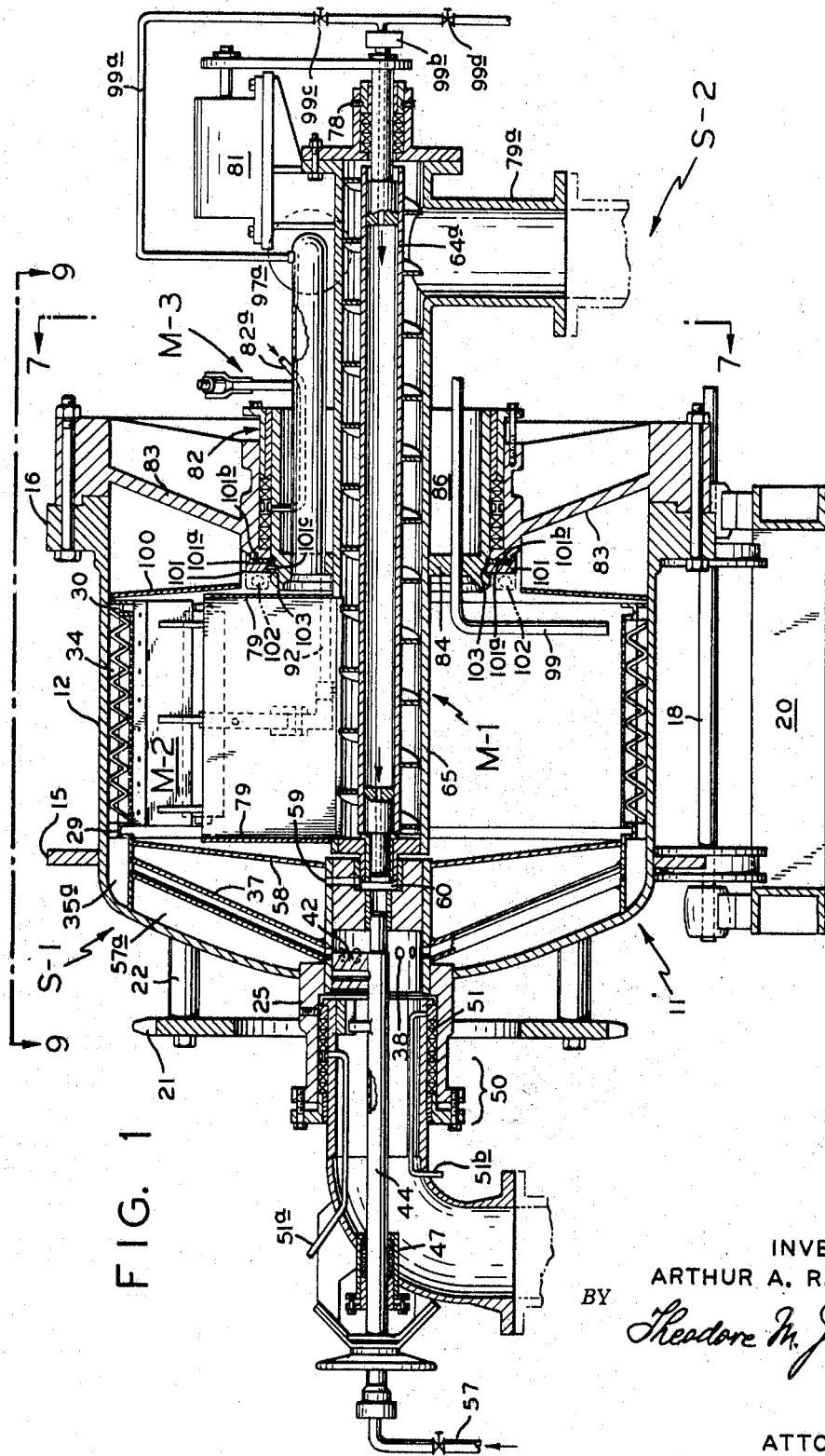

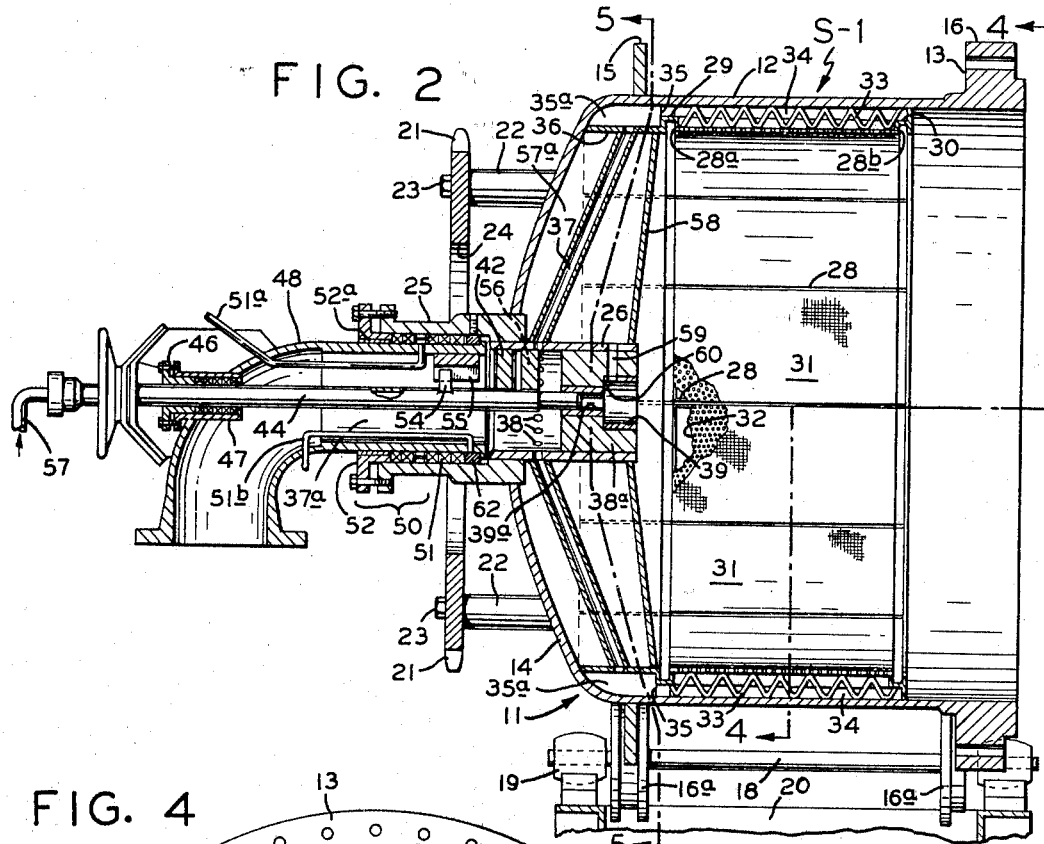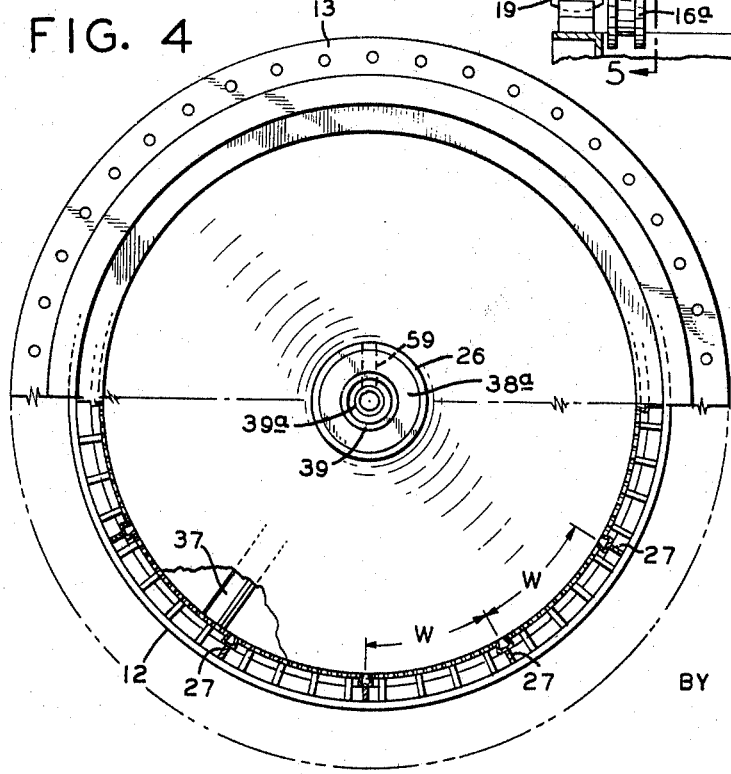

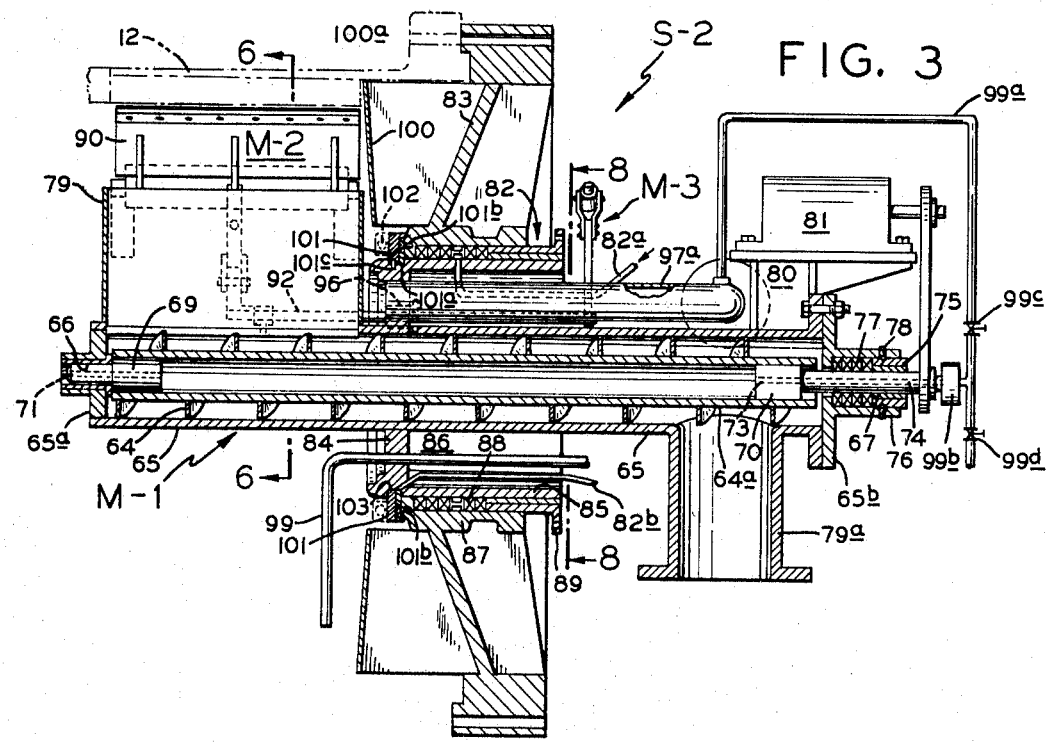

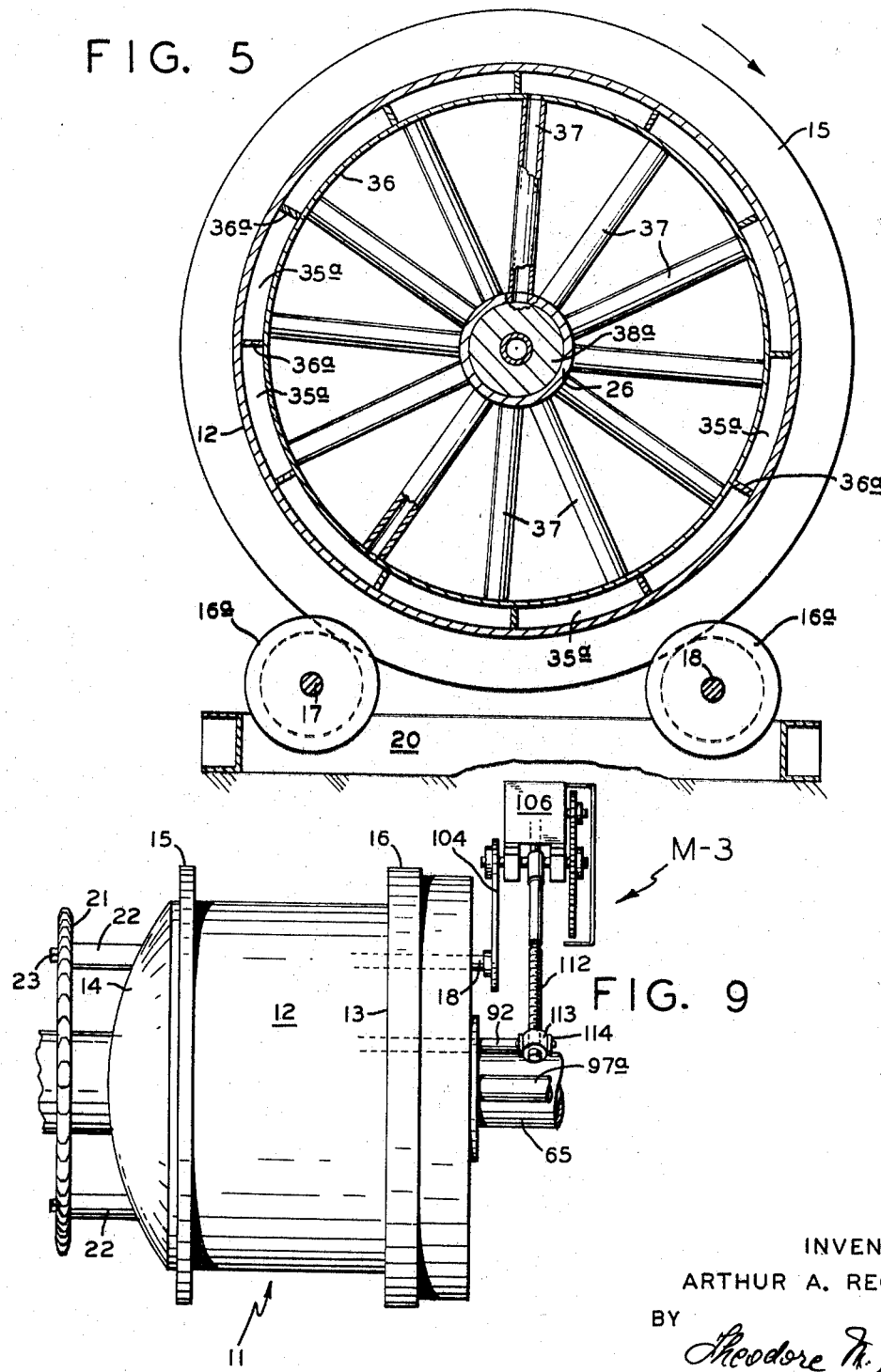

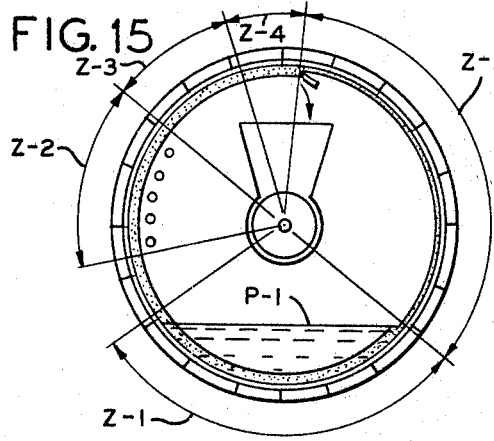
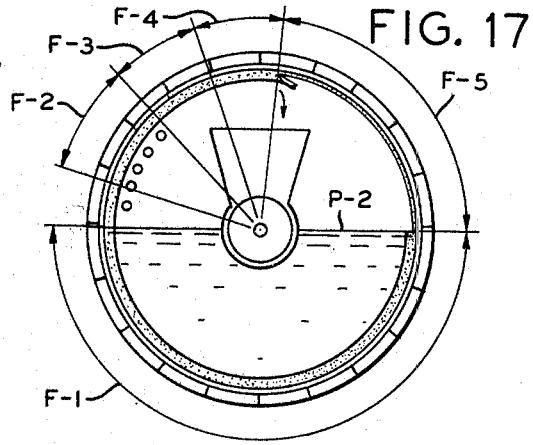
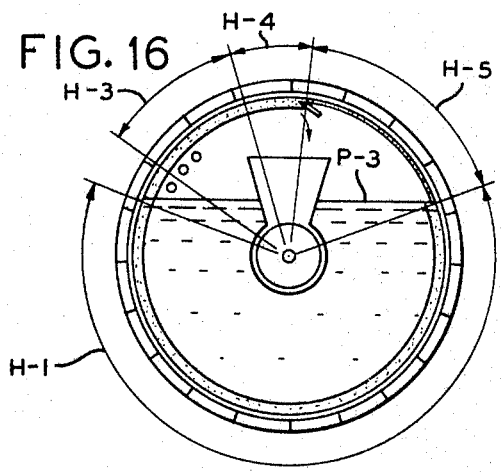
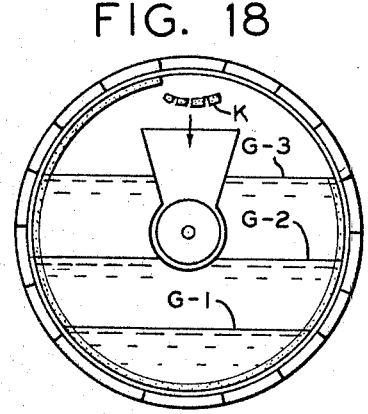
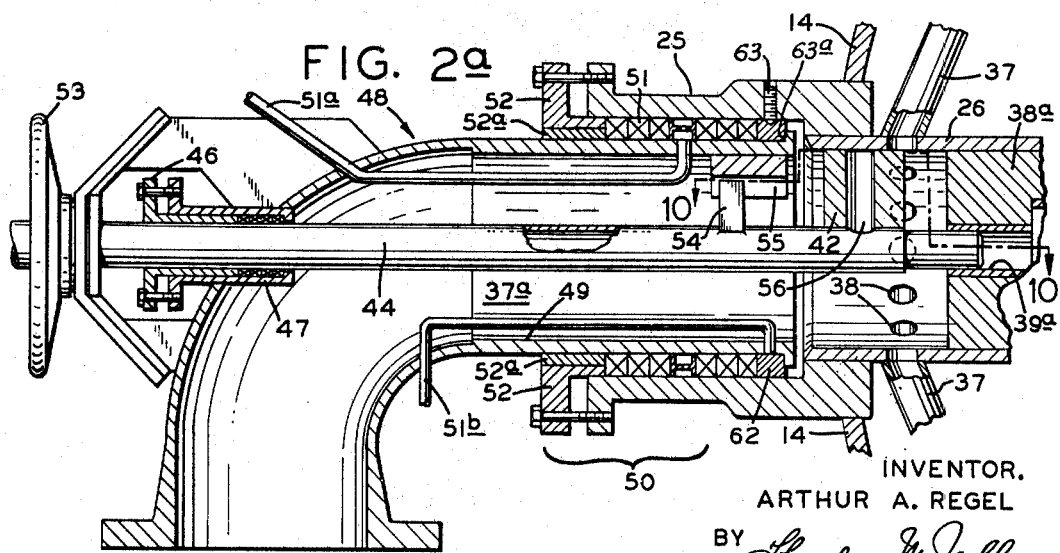

United States Patent Office 3,485,378
Patented Dec. 23, 1969

3,485,378
ROTARY DRUM FILTER WITH INTERIOR
FILTER PANELS
Arthur A. Regel, Flushing, N.Y., assignor to Dorr-
Oliver Incorporated, Stamford, Conn., a corporation of Delaware
Filed Feb. 23, 1967, Ser. No. 618,178
Int. Cl. B01d 33/36, 33/10
U.S. Cl. 210—393                                    40 Claims

ABSTRACT OF THE DISCLOSURE

This invention relates to drum filters rotating about a horizontal axis, and more particularly to improvements in the type where the filter cake is formed upon filter panels provided interiorly of the drum, with pulp being continuously fed into the drum through a central opening in one end thereof, and the filter cake discharging through said opening, and the filtrate liquid being delivered from the filter panels through the hub portion of the opposite end of the drum, which drum may be rotated upon track rollers supporting the forward and the rearward ends of the drum.

---

In this so-called "internal" drum filter the cake forms in the filtration zone as determined by the depth of pulp inventory maintainable within the drum. As the drum rotates the cake emerges from the bath of pulp, and when reaching the uppermost or 12 o'clock position of drum rotation, is caused to discharge into a hopper located within the drum, and usually connected to the trough of a horizontal screw conveyer delivering the cake material through a central opening in one end of the drum. The diameter of this central opening limits or determines the maximum of the pulp level maintainable within the drum, and thus limits the extent to which the filter area may be kept submerged and utilized in the filtration and cake formation zone.

Filtrate liquid from the internal filter panels in this type of drum filter discharges through the central hub portion at the opposite end of the drum, opposite to the cake discharge end, and usually through a conventional so-called trunnion valve cooperatively associated with the hub portion, and connected to a source of vacuum. The valve in controlling the filtration cycle communicates with the filtrate collecting chambers of the filter panels through respective filtrate discharge conduits or pipes extending from the hub portion radially to the respective filter panels. The filtration cycle usually includes a back-blow operated filter cake discharge phase.

The drum may rest and rotate upon two pairs of supporting rollers cooperating with respective annular tracks concentrically surrounding and fixed to respective end portions of the drum, with suitable drive mechanism provided for rotating the drum.

In some respects this "internal" drum filter offers practical operating advantages over the so-called "external" type of drum filter which has the filter panels provided externally upon the drum operating partially submerged in a bath of pulp or slurry in a vat. Depending upon operational requirements of a respective filtration cycle, this type of drum filter may be operated at a deeper submergence but still limited to about 50% to 55%, this limit being due to the location of the cake discharge means disposed laterally adjacent to the descending side of the rotating drum. Furthermore, even with a usual pulp agitating mechanism provided in the vat, a heavy solids fraction may collect below the drum upon the bottom of the vat. Furthermore, upon completion of a filtration run a so-called "heel" of residual pulp is necessarily left below the drum, which must be drained from the vat and handled, and which, if perishable, may be lost. Such losses would multiply for a sequence of relatively short filtration runs, for example where precoat filter operation is required.

The need for precoat filter operation arises, for instance where a maximum of valuable filtrate liquid is to be recovered from a slurry substantially containing discardable fines that otherwise might escape through the filter media or else might lead quickly to blinding of a filter cloth.

In such instance, a substantial layer of filtrate-permeable precoat material, such as diatomaceous earth or the like, is first collected upon the filter media in an auxiliary preliminary precoating filtration operation. In the subsequent actual filtration operation a doctor blade advancing towards the filter surface in minute degrees geared to the rotation of the drum, continuously scalps off the thin layer of filter cake or fines together with some of the underlying precoat material. This scalping filter operation must be interrupted whenever a replenishing of a residual layer of precoat material is indicated.

At times it may be necessary to clear out even the residual layer of precoat material, in order that the filter media may undergo a cleansing operation. At any rate, a precoat filter operation entails a frequent loss of residual "heel" material be it from the precoating slurry operation or from the actual filtration operation.

Hence, by comparison, the operating principle of the conventional "internal" drum filter avoids those "heel" losses of residual pulp even as gravity settling of the particles irrespective of particle size aids in the formation of the filter cake, although the extent of submergence of the filter media is limited, for the reason pointed out above, to substantially less than the 50% submergence attainable in the "external" drum filter type.

Another aspect of this invention is concerned with instances where vacuum filtration has been contraindicated, as in the case of filtrate liquids tending to foam, or where volatile constitutents are present in the pulp to be subjected to continuous filtration.

In such instances, heretofore, the "external" drum filter being capable of the relatively deeper drum submergence has been equipped in such a way that an auxiliary controllable gas supply would maintain a pressure cushion acting upon the pulp surface in the vat, to provide the required pressure differential across the filter media on the drum.

Accordingly, heretofore the external drum filter unit has been provided with a hood structure having gas-pressure tight connection with the vat, along with pressure sealing cake discharge means, with means for pressure feeding the pulp into the vat, and with controllable means for maintaining the desired filtration pressure differential. A closed filtrate receiver tank was provided wherein a controllable back pressure could be maintained by a gas pressure cushion in cases where such operation was required due to the presence of volatile or foam-tending constituents in the filtrate liquid. In such cases, too, the use of a special pressuring gas other than air may be required. The spent gas escaping through the filter cake was trapped in the receiver tank to be recovered and re-compressed for re-use.

However, such a pressurized external drum filter is bulky, and has not been wholly satisfactory both in construction and in operation, inasmuch as the applicable gas pressure was relatively limited, in view of gas sealing problems and gas leakage losses, and difficulties of filter cake removal from the pressurized filter drum enclosure. Also, there were the aforementioned drawbacks of residual heel pulp losses and the aforementioned upper limit submergence limitations translatable into limitations of the filtration cycle.

It is an object of this invention to provide an improved rotary drum filter of substantially universal versatility. This filter therefore should embody not only the aforementioned features and advantages of the "internal" drum filter over the "external" drum but should also be readily gas sealable and resistant against relatively high operating gas pressures, should be operable over a wide range of submergence including an exceptionally high pulp level or deep submergence free from the aforementioned submergence limitations either in vacuum or in pressurized filter operation, and it should be capable of efficient pre-coat filter operation even in a gas-pressurized atmosphere.

Another object is to provide a filter unit that is versatile in the sense that it can be employed for various kinds of filtration cycles. Accordingly, the filter having the foregoing characteristics and advantages should, by simple conversion, be operable either by vacuum or by pressurization, each in turn operable either with effective back-blow cake discharge or effective pre-coat operation.

Another object is to provide such an improved versatile drum filter unit that is of generally simple and compact construction, can be readily shipped, can be readily inspected and have its performance checked during operation, and which consists of compact co-axial main assembly units which can be readily disconnected and axially withdrawn from one another for inspection and overhaul.

In view of the aforementioned problems and objectives, the improved filter unit of this invention comprises a drum supported for rotation preferably in the manner above set forth, and equipped with internal filter panels and with the devices for slurry supply into the drum, for cake discharge from the interior of the drum, and for filtrate delivery from the panels. In particular, this filter unit comprises a detachable cover member closing the cake discharge end of the drum, and having a gas-pressure tight connection therewith.

A tubular casing of the cake discharge conveyer extends concentrically through a much wider opening in the cover member. The annular space or clearance between this stationary casing and the surrounding rotating cover member is closed by a flange or annular member fixed upon the conveyer casing, and peripherally engaged by the surrounding cover member or drum in sealing relationship therewith. The conveyer casing has guide bearing support in the respective ends of the rotating drum construction, and is secured against axial displacement relative to the rotating drum as well as secured against rotation. The inner end bearing of the casing may become submerged in the pulp when operating with deep submergence. But the provision of air pressure purging means may protect the bearing.

The intermediate flange on the stationary conveyer casing provides the means through which various supply pipes for pulp, and pressure gas, and others may enter the interior of the tank, as well as an actuating shaft for moving the doctor blade of a cake scalping mechanism, all in sealed relationship with the flange.

In case of gas pressruized operation, it will be understood that this filter unit will have its cake discharge as well as its filtrate delivery sealed in a manner to contain the desired operating pressure or filtration pressure differential in the drum.

In any instance, be it gas pressure or vacuum operation, or filtration with or without pre-coat, the filter unit of this invention may be operated with a submergence pulp level located well above the drum axis or 50% limit, and substantially in excess of submergence limits heretofore practically attainable in the operation of rotary drum filters.

According to one feature, the improved drum filter unit comprises two self-contained main assembly units, the one of which comprises the rotary drum and parts associated or connected therewith, the other one comprising the detachable end-cover carrying the cake conveyer mechanism preferably combined with the scalping doctor blade device and other operating accessories. After unbolting the flange connection between the two assembly units, the latter assembly unit may be axially withdrawn, while the other assembly unit remains in place with the interior of the drum when wholly and unobstructedly exposed.

More specific features lie in the arrangement of various sealing means or stuffing boxes effective between stationary and rotating parts of the filter unit; in the arrangement of a doctor blade pre-coat scalping mechanism operable in the pressurized atmosphere of the interior of the drum, and a train of actuating elements therefor; in the construction and operation of the guide bearing means for the tubular conveyor casing; in a novel arrangement of valve means including back-blow means, associated with the filtrate discharge end of the drum, for controlling certain phases in the operation of a pre-coat filtration cycle, in the provision of simple and effective air pressure purging means for the bearing at the inner conveyor end; and in various operational controls.

Still other features lie in the construction and operation of the guide bearing means through which the tubular conveyor casing is supported in and by the rotating drum.

Other features and advantages will hereinafter appear.

FIG. 1 is a vertical longitudinal sectional view of one embodiment of the filter unit equipped for gas-pressurized internal pre-coat filtration operation, and featuring two separable sub-assembly units one of which comprises the drum, the other comprising the separable cover member for the drum.

FIG. 2 is a vertical longitudinal sectional view taken from FIG. 1, showing the one sub-assembly unit.

FIG. 2a is an enlarged detail view taken from FIG. 1 of a valve construction featuring a sliding shoe controlling a filtration cycle.

FIG. 3 is a vertical longitudinal sectional view taken from FIG. 1, showing the other sub-assembly unit.

FIG. 4 is a cross-sectional view of the filter drum taken on line 4—4 in FIG. 2.

FIG. 4a is an enlarged detail taken from FIG. 4.

FIG. 5 is a cross-section taken on line 5—5 in FIG. 2, showing the arrangement of filtrate discharge pipes in the drum.

FIG. 6 is a cross-sectional view taken on line 6—6 in FIG. 3, showing details of the pre-coat cake scalping device, located within the drum.

FIG. 7 is a cross-sectional view of the filter unit taken on line 7—7 in FIG. 1, showing the cover end of the filter unit, as well as actuating mechanism for the cake scalping device, located externally of the drum.

FIG. 8 is a detail cross-sectional view taken on line 8—8 of FIG. 3, showing the location of an actuating shaft extending into the pressurized drum, as well as of conduits leading into, and out of the pressurized drum.

FIG. 9 is a plan view of the filter unit showing further the location of the actuating mechanism of FIG. 7.

FIG. 10 is a horizontal sectional detail view of the valve construction taken on line 10—10 of FIG. 2a, showing one operating position.

FIG. 11 is similar to FIG. 10 showing another operating position.

FIG. 12 is a cross-section taken on line 12—12 of FIG. 10, showing the contour of the sliding shoe.

FIGS. 12a and 12b are details of the slide shoe illustrating the exchangeability thereof.

Figure 13:
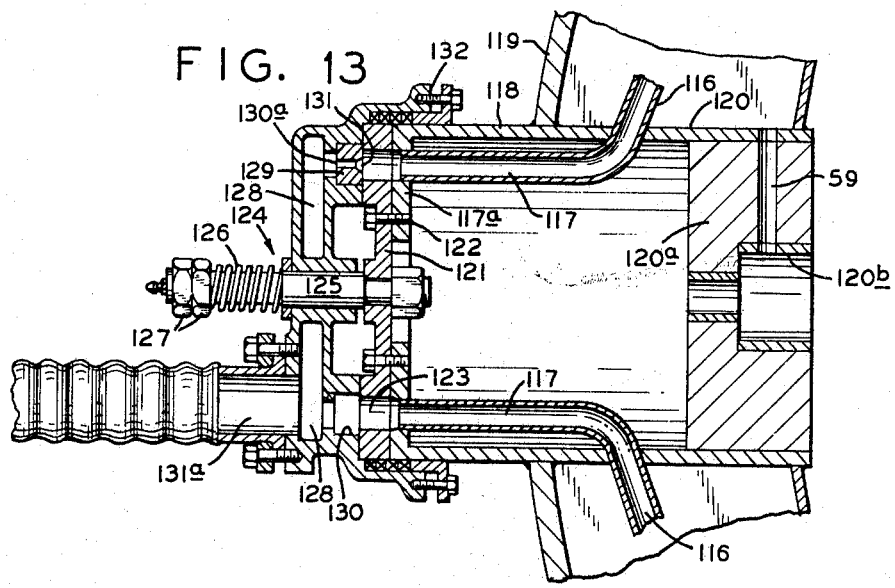
FIG. 13 is a longitudinal vertical sectional view of an alternate filtrate discharge valve construction or trunnion valve.

FIGS. 15, 16, 17, further illustrate the filter unit diagrammatically under pre-coat operating conditions at different submergence levels.

FIG. 18 similarly illustrates the filter unit of this invention operated without pre-coat, but at various submergence levels.

Although the rotary drum filter of this invention, in the preferred embodiment herein shown, is equipped for gas-pressurized pre-coat operation, the machine also lends itself to gas-pressurized filtration without pre-coating, or else to vacuum filtration with or without pre-coating. According to other alternatives or operation, this machine may operate with a required filtration pressure and filtrate vacuum, or by a combination of a higher super-atmospheric gas pressure within the filter drum with a lower super-atmospheric pressure at the filtrate discharge or vacuum receiver side of the machine. Also, the machine is readily convertible or adaptable to a universal variety of filter operating cycles, even while retaining the advantages of efficient internal filter cake discharge together with a wide range of available submergence levels. Also, the drum or shell can be readily and efficiently pressurized internally with minimum escape of pressurizing gas, while the diameter of the shell need only be slightly greater than the diameter of the internal filter area. Furthermore, some features of this invention may be used without others, and some features may be used in other types of drum filters. All as will be more fully understood from the following detailed description of the filter and its various modes of operation.

The filter unit shown in FIGURE 1 comprises two separable main sub-assembly units S–1 and S–2 separately shown in FIGURES 2 and 3 respectively.

In the sub-assembly S–1 of FIGURE 2 a shell or drum 11 comprises a cylindrical body portion 12 formed at one end with a flange 13, and at the other end closed by a domed or dished end closure wall 14 welded to the body portion. A pair of annular tracks 15 and 16 concentric with the drum axis are provided at respective ends of the body portion, the latter track being in the form of the flange 13 itself.

This drum is supported for rotation upon rollers 16a indicated in FIGURES 1, 2, 5, and 7. These rollers are mounted on shafts 17 and 18 which are parallel to the drum axis, and in turn have bearings 19 mounted upon a horizontal frame as base construction 20.

Drive means for rotating the drum are not shown, except for a large sprocket 21 concentric with the drum axis and mounted upon the end closure wall 14 which has lugs 22 to which the sprocket is fixed by means of screw bolts 23. The sprocket has a large central opening 24 through which extends a hollow hub portion 25 of the end closure wall.

The hub portion has a coaxial cylindrical extension 26 provided interiorly of the dished end portion of the drum.

Upon the interior face of the cylindrical body portion 12 there are provided filter panels conforming to the curvature of the drum, as indicated by their arcuate dimensions W in FIGURES 4 and 4a. These filter panels are defined relative to one another by division strips 27 extruding radially inwardly from the inner face of the drum and horizontally coextensive with the drum axis. Fixed to each division strip along the length thereof is an inwardly open channel member 28 parallel to the drum axis, and having an inner end 28a and an outer end 28b. All the inner ends are interconnected by a ring-shaped inwardly open channel member 29, while all the outer ends are interconnected by a similar ring-shaped channel 30, both ring-shaped channel members are concentric with the drum axis, extending in respective planes parallel to each other and transversal of the drum axis. The grooves of the longitudinal channel members communicate with the grooves of the respective ring-shaped channels in such a manner that each filter panel is in effect framed by a pair of straight grooves and a pair of arcuate grooves, all of which communicate with one another, and wherein the edges of filter media 31 of the respective panels are packed and secured in a manner well known in the art.

The filter media which may be a textile fabric or fine wire mesh, are supported upon a perforate curved backing plate 32 which has fixed thereto spacer elements in the form of corrugated strips 33 defining the depth P of the drainage chambers 34 of the panels. The ring-shaped channels have small supporting ribs 35 (see FIGURES 2 and 4a). From the drainage chambers 34 the filtrate liquid passes into endwise adjoining respective collecting chambers 35a (see FIGURES 2 and 5) located between the panels and the dished end of the drum. These collecting chambers are formed by a common cylindrical partition wall 36 concentric with the drum axis and by longitudinal partitions 36a (see FIGURE 5) which in effect are longitudinal extensions of the division strips 27.

From each of the collecting chambers 35 a filtrate discharge or drainage pipe 37 leads to cylindrical hub extension 26 and thus into a common collecting chamber 37a as indicated by the terminal openings 38 of the pipes, spaced evenly from one another about the drum axis (see also FIGURES 10 and 11). Thus, as best shown in FIGURE 5, the pipes converge radially from the chambers 35 to the hub extensions 26.

The inner end of the cylindrical hub extension is closed by a plug member 38a providing a bearing support 39 for the inner end of a screw conveyor mechainsm M, as well as a bearing support 39a for a special slide valve member 42 (see also FIGURES 10, 11, 12) provided for by the invention to control the cycle of a precoat filter operation.

The slide valve member which is shiftable coaxial with the drum axis, comprises a shoe 43 having an outer arcuate contact face conforming to the inner face of the cylindrical hub, and axially slidable thereon. The arcuate face extends over an arc A (see FIGURE 12) representing what is herein called a "dead zone" of the filtration cycle, being located at the descending side of the drum between filter cake discharge and re-entry of the filter media into the pump. When shifted axially to the position shown in FIGURE 10 the shoe will therefore partially close a number of terminal openings 38 moving through arc A during rotation of the drum. In this way, only a relatively small adjustable flow of pressurizing gas is allowed to escape through the residual layer of pre-coat filter material in the "dead zone" of the cycle, that is after the flow-retarding thin cover layer of production filter cake has been removed by the scalping operation, the throttled flow will nevertheless to be sufficient to insure that the precoat material will adhere intact to the filter media while passing through that zone.

The extent of the "dead zone" may be varied as illustrated in FIGS. 12a and 12 showing a detachable shoe 38a bolted at 38b to an arm or lug 38c extending at right angles from the tubular rod 44a and having a radial port 38d.

For axially shifting between the positions of FIGURE 11 and 10 the shoe 43 is fixed upon a tubular slide rod 44 coaxial with the drum axis. The inner end of this shaft has sliding fit in bearing support 39a, while the outer end is slidably supported in the gland 46 of a stuffing box 47 contained in the wall of an angular filtrate discharge duct or elbow 48. This elbow has a horizontal shank portion 49 aligned with the cylindrical hub of the drum, and is surrounded by the hollow external hub portion 25 of the drum, so as to constitute therewith a stuffing box 50 containing a packing 51. A gland member 52 of this stuffing box rotates with the drum, and is constructed to provide bearing support 52a for the stationary horizontal shank. Pressure lubrication for the packing 51 is provided by a pipe 51a extending through the wall of elbow 48.

The tubular rod 44 is adjustably shiftable together with the shoe by means of hand wheel 53 between the advanced position of FIGURE 10 and the retracted position of FIGURE 11. A radial lug or finger 54 on the rod cooperates with a guide groove 55 to secure the shifting rod against rotation. In the normal operating position of FIGURE 11 the shoe partially covers the passages 38 in the "dead zone" of the cycle, thus throttling the gas escape therethrough, while a radial port 56 in the shoe is out of communication with the terminal openings. The radial port through the hollow shaft communicates with a controllable back blow gas or pressure air supply 57. Advancing or shifting the shoe from the FIGURE 11 position will bring the port into communication with the terminal openings 38 so that back blow may be applied sequentially to the filter panels as they pass through their zenith or filter cake discharge position. Such back blow may be applied during a filter cleansing operation, when normal filter operation is interrupted and before a new layer of precoat filter material is applied. In this interim the back blow in the FIGURE 10 position will dislodge a residual layer of worn precoat material into the hopper for disposal, to free and cleanse the media for reapplication of a full thickness of fresh precoat material.

The domed end space 57a of the drum containing the pipes 37 is separated from the cylindrical space containing the filter panels by an annular transverse baffle or partition wall 58 the outer periphery of which is sealingly welded to the surrounding cylindrical partition wall 36, while the inner periphery may be sealingly welded to the cylindrical hub extension 26. However, provision is made for the enclosed end space 57a to communicate through a radial port 59 with space 60 in plug member 38a, whereby the pressure on both sides of the partition wall is equalized.

The stationary elbow or filtrate discharge duct 48 is secured against axial displacement (see FIGURES 1 and 2a) by means of a retainer ring 62 located within the stuffing box and surrounding the end of the horizontal shank of elbow 48. This ring is held in place by a number of set screws 63 (see FIG. 9a) so it will rotate with the hub portion of the drum, while engaging a terminal annular shoulder 63a (see FIG. 9a) of said horizontal shank. Pressure lubrication for the thrust bearing 62 is provided by a pipe 51b extending through the wall of elbow 48.

The sub-assembly unit, S–1 of FIGURE 2 described above may be joined to the sub-assembly unit of FIGURE 3 to constitute the filter unit of FIGURE 1 of this invention.

In the sub-assembly unit S–2 the discharge conveyor mechanism M–1 for the filter cake material comprises a horizontal conveyor screw 64 coaxial with the drum axis rotating in a tubular conveyor casing 65, with an inner bearing 66 and an outer bearing 67 supporting the respective ends of the hollow conveyor shaft 64a in respective end walls 65a and 65b of the casing.

The conveyor shaft comprises a tube closed by end plug member 69 at the inner end, and by plug member 70 at the outer end. Plug member 60 has an axial bore 71 and a reduced end extension supported in a bearing 66. Plug member 70 has an axial bore 73 and a reduced end extension 74 supported in a bearing provided by the gland member 75 of a stuffing box, and fitted into a neck 76 extending axially from the outer end wall of the conveyor casing. The packing 77 of the stuffing box is confined by the gland member which is held in place by set screws 78.

Mounted upon the inner end of the conveyor casting is a hopper 79 for receiving filter cake from the filter panels when they reach their inverted or zenith position in the rotation of the drum. The conveyor screw moves the cake material to an outlet neck 79a at the outer end of the conveyor casing, which end has fixed thereon a bracket or platform structure 80 carrying a drive motor unit 81 for rotating the conveyor shaft.

The intermediate part of the conveyor casing is surrounded by a dual purpose stuffing box 82 coaxial with the conveyor screw, that is a stuffing box providing in this instance not only an effective seal against gas pressure to be maintained inside the filter drum, but also providing a bearing to support the stationary conveyor mechanism or tubular casing in a surrounding cover member 83 which in turn is bolted coaxial to the flanged end of the filter drum in fluid-tight and pressure-tight relationship therewith (see FIGURE 1).

To establish the stuffing box 82 for the purpose of this invention, an annular member or flange 84 surrounds the tubular conveyor casing fixed thereto about midway between the ends thereof. From the periphery of this flange extends concentric with the drum axis a cylindrical extension or skirt portion 85 surrounding an annular space 86. This skirt portion represents the inner stationary part of this stuffing box, an outer rotary part of the stuffing box being represented by a cylindrical hub 87 of the cover member 83. The packing 88 is confined in the space between the stationary and the rotary part of this stuffing box and by a gland member 89 fitted to serve as bearing support for the skirt portion 85 and thus for the conveyor mechanism together with the motor drive unit, the filter cake receiving hopper, as well as other accessories. Pipe 82a provides pressure lubrication to the packing 88.

Among the accessories is a filter cake scalping mechanism M–2 shown in FIGURES 1, 3 and 6. This mechanism comprises a scraper blade or scalping member 90 having a cutting edge parallel to the drum axis, and mounted for scraping convenient on brackets 91 fixed to hopper 79, and actuated by the rotation of a horizontal shaft 92 supported on the conveyor casing. Rotation is transmitted through a pair of cooperating lever arms 93 and 94 fixed respectively to the shaft and to the scraper member and having lost-motion slot connection 95 with one another. Accordingly, rotation of shaft 92 in direction of arrow R–1 will move the scraper member towards the filter cake, while rotation in the direction of arrow R–2 will retract the scraper member.

The actuating shaft 92 penetrates the flange 84, extending parallel to the drum axis and parallel to the axis of rotation of the scraper member, and it has a stuffing box 96 to seal the penetration (see FIGURES 1, 3, 8).

Also extending through flange 84 (see FIGURE 8) in sealed relationship therewith are various stationary conduits or pipes required for the operation of the machine, such as a feed pipe 97 for the pulp, and pipe 97a to supply gas pressure.

There may be liquid feed pipes 98 for wash and spray pipe systems (not shown) which may be carried by the hopper within the drum, and for example a bubble type probe 99 (see FIGURES 1, 3, 8) for monitoring and controlling the pulp level within the drum connected to conventional pressure differential responsive means not shown. A lighting conduit 40 and a periscope type viewing instrument 41 or the like extend through flange 84 into the interior of the drum, both in pressure tight connection with the flange.

In FIGURES 1 and 3 gas pressure from pipe 97a is supplied to branch pipe 99a and rotary joint 99b to the interior of the hollow conveyor shaft and thus to space 60 at the inner end thereof, for pumping the bearing 39. By manipulating valves 99c and 99d a separate gas pressure supply 99e may be substituted.

In FIGURE 3 a transverse annular baffle wall 100 concentric with the drum axis and spaced inwardly from the cover member 83 is fixed thereto by means of radial plates 100a. From the assembly of the machine in FIGURE 1 it is seen that this baffle wall cooperates with the opposite partition wall 58 to confine between them the formation of the filter cake from the pulp.

In order to move the scalping member or scraper blade 90 in small or minute increments towards the filter area, the shaft 92 is geared to the rotation of the drum by an external actuating mechanism M-3 of high reducing ratio (shown in FIGURES 7 and 9, and partially indicated in FIGURES 1 and 3) to be described below.

The conveyor mechanism or conveyor casing is secured against axial displacement relative to the rotary cover member 83 by means of a retainer ring 101 split in two halves which are detachably bolted together at 102 and fitted into peripheral grooves of flange 84 of the tubular conveyor casing. Radially directed dowel pins 103a secure the retainer ring against rotation in the groove. The retainer ring engages a thrust washer 101a which is detachably bolted to the inner end face of the cylinder hub 87 of cover member 83. Pressure lubrication for the thrust washer is provided by a pipe 82b extending through the annular space 86 surrounding the conveyor casing.

Referring to FIGS. 7 and 8 the aforementioned external actuating mechanism M-3 for the scalping blade comprises a train of elements whereby the rotation of shaft 92 and thereby the scalping blade is geared to the rotation of the drum. In this embodiment the input is derived from the rotation of one of the rollers 16 supporting the drum. Acordingly, a sprocket chain 104 transmits rotation of the roller or roller shaft to a counter shaft 105 mounted laterally upon the foot end of a rising rigid support structure 106. A large sprocket 107 on this counter shaft transmits the rotation through chain 107a to the input shaft of a reducer gear box 108 providing very high reducing ratio. The output shaft 110 of the gear box has a universal joint connection 111 with one end of a screw spindle 112 the effective length of which is adjustable. The other end of the screw spindle is engaged by a nut 113 having pivotal or trunnion connection with a lever arm 114 fixed upon shaft 92. This, in addition to the reducing ratio provided by the gear box there is provided the ratio due to the rotation of the screw spindle in the nut, with parts 110, 112, 113, 114 all operating in a plane transversal of the drum axis.

A limit switch 115 mounted upon the gas pressure supply pipe 97a (see FIGURE 7) is actuated by lever arm 114 to stop the operation of the machine when the precoat scalping operation has reached the point where residual pre-coat material must be replenished or replaced. A reversal mechanism in the gear box may then be operated in order to retract the scalping blade to an inoperative position.

As an alternative to the above described slide shoe valve arrangement for pre-coat filter operation, a conventional trunnion valve may be adapted to the multiple purposes of the filter unit of this invention. In such a trunnion valve illustrated in FIGURE 13, the shape and setting of the internal control bridges or blank-off blocks would be arranged in various ways for controlling filtration cycles with or without pre-coat operation. With pre-coating the scalping device continuously removes the thin layer of filter cake together with some of the pre-coat material, whereas in direct filtration without pre-coating the scalping mechanism or at least the scalping member may be omitted or be moved to an out-of-the-way position, since the operating cycle then provides for back blow filter cake discharge into the hopper.

To connect with the alternate valve construction of FIGURE 13 the filtrate drainage pipe 116 have horizontal end portions 117 terminating in a tube plate 117a fixed to the outer end of a cylindrical hub portion 118 of filter drum 119. An inward extension 120 of the hub portion resembles a similar part in the embodiment of FIGURE 5, in regard to a plug 120a closing the inner end and providing bearing means 120b for the inner end of the screw conveyor. A wear plate 121 is detachably fixed to the tube plate as by bolts 122, with holes or flow passages 123 in the wear plate matching respective adjoining ends of the pipes. A stationary valve head 124 is held in face-to-face operating contact with the wear plate by means of a stem 125 fixed in the wear plate coaxial with the drum axis. A compression spring 126 surrounding the stem and confined by lock nuts 127 urges the valve head to maintain the operating contact of the parts.

When this trunnion valve is prepared for controlling a pre-coat filter operating cycle, the pipes 116 will communicate freely with an annular manifold 128 formed in valve head 124, except where the tubes move through a flow throttling zone or "dead zone" of the filter cycle, defined by an arcuate or sector-shaped bridge member 129 fitted into an annular recess 130 along which it is slidably adjustable.

The bridge member may have restricted openings 130a interconnected by a groove 131, so that the resulting flow throttling effect is comparable to that of the flow-throttling shoe in the above described slide valve construction of FIGURES 10, 11, 12. A filtrate discharge duct 131a leads from the valve head to a receiver.

In regard to FIGURE 13 it will be understood that the arcuate length of the bridge member corresponds to the required extent of the throttling zone or "deal zone" which in turn is determined by whatever pulp level elevation is to be maintained within the drum. Of course, the bridge may comprise a series of smaller sector-shaped bridge members laterally abutting one another, allowing the extent of the throttling zone to be varied by the removal or addition of one or more of the component bridge members.

Also, bridging and internal partitioning in the valve head may be arranged for controlling a filtration cycle operating without pre-coat and with blow back filter cake discharge, or for controlling cycles which require separate cake washing and cake drying zones or phases at the asceiding side of the drum and preceding the cake discharge phase.

While the compression spring 126 may hold the valve head operatively engaged even against a counter pressure maintained in the filtrate receiver when the drum is gas pressurized, a stuffing box 132 formed by the valve head and the adjoining hub portion of the drum will prevent gas leakage at the interface of valve head 124 and the rotating wear plate 121.

Figure 14:
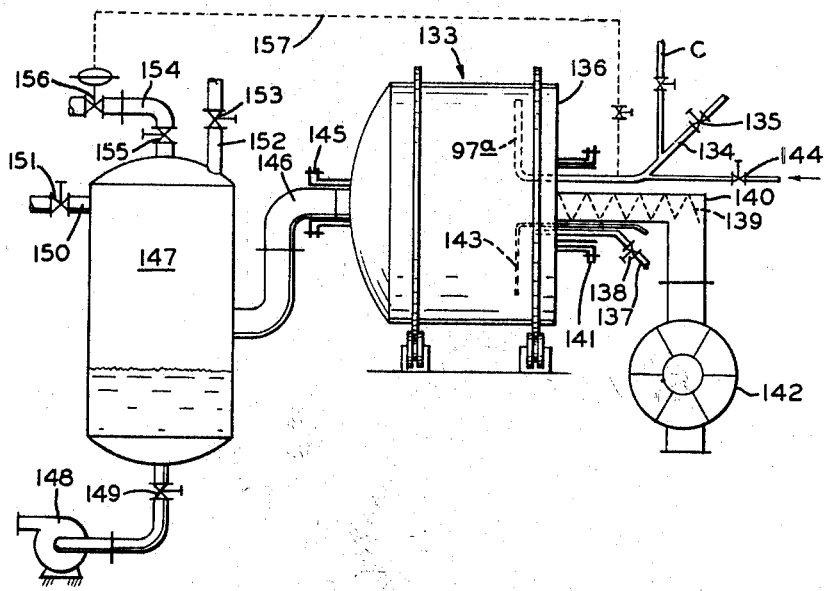
FIG. 14 is a diagrammatic side view of a filtration system employing the filter unit of this invention, in connection with appropriate discharge receivers.

The filter unit of this invention is operable in a system schematically shown in FIGURE 14. Accordingly, such a filter unit 133 has indicated at one end a gas inlet conduit 134 with closure valve 135 for feeding the pressurizing gas into the interior of the drum 136, a pulp inlet conduit 137 with closure valve 138 for feeding pulp into the drum, as well as the cake discharge conveyor screw 139 enclosed in casing 140. The casing 140 as well as the conduits 134 and 137 are surrounded by stuffing box 141. The conveyor casing may be pressurized or sealed against the atmosphere, for example, by having the filter cake material discharge through the rotating sealed cells of a star wheel device 142 or by delivery into a pressurized receiver, or else by having the screw conveyor itself function as a pressure sealing device with the cake material compressed by the conveyor screw to pressure sealing consistency at the delivery end thereof. A bubble type probe 143 also extending through the area surrounded by the stuffing box permits maintaining the desired pulp level in the drum. Also extending through this area by way of a stuffing box is the horizontal shaft (here not shown) that actuates the above described cake scalping mechanism within the drum. But if the interior of the drum is to be vented, then the gas inlet valve 134 is closed while an adjoining vent valve 144 is opened.

The opposite end of the rotating drum delivers filtrate liquid through a stuffing box 145 into a stationary discharge duct or pipe 146 connected to a receiver 147. A body of filtrate liquid collecting in the receiver tank may be drawn down periodically or at a controlled rate by a pump 148 when a valve 149 in the bottom outlet of the tank is open. The tank may have a vacuum connection 150 provided with closure valve 151, and a vent pipe 152 provided with closure valve 153. The tank may also have an auxiliary connection 154 with closure valve 155, communicating with an automatic differential pressure responsive control valve unit 156 associated with an interconnecting equalizer pipe 157. Closing the valve 155 will render the differential pressure control device inoperative.

Various modes of operation of the system present themselves as follows:

(a) The filter drum may be gas-pressurized through valve 135, while the resulting filtrate liquid discharges to atmospheric pressure, with receiver vent valve 153 open, but filter vent valve 144 and tank valves 151 and 155 closed.

(b) The filter drum may be gas-pressurized through valve 135, while a lower yet super-atmospheric counter pressure is maintained in the receiver tank, with tank vacuum valve 151 closed, but tank valves 153 and 155 and filter vent valve 144 closed. Simultaneously, the probe 143 maintains the pulp level at a desired elevation.

(c) This system also permits a straight vacuum filtration, in which case the filter vent valve 144 and the tank vacuum valve 151 are open, while the gas pressure supply valve 135, and the tank valves 153 and 155 are closed. Atmospheric pressure is thus admitted to the interior of the filter drum, with the tank becoming a vacuum receiver, while the pressure sealing cake delivery device is omitted.

(d) Where the nature of the filtrate liquid permits, this system may also be operated by a combination of vacuum maintained in the receiver tank, and gas pressure maintained within the filter drum, by setting the appropriate valves. In this way, a relatively great filtration pressure differential is attainable, with only a relatively moderate pressure to be maintained within the filter drum.

(e) Any one of the foregoing modes of operation may be carried out either for a filtration cycle with pre-coating and a cake scalping device, or for a direct-filtration cycle carried out without pre-coat and without scalping device, but with back blow actuated filter cake discharge.

As indicated and exemplified in the filter cycle diagrams of FIGURES 15, 16, and 17, the operation in any of its alternatives set forth above may be conducted within a wide range of pulp levels in the filter drum, be it for pre-coat filter operation (see FIGURES 15, 16, 17) or for direct filter operation without pre-coat and with blow-back discharge of the filter cake (see FIGURE 18).

Operating at shallow pulp inventory or low pulp level P–1 below the conveyor casing as in FIGURE 15 may be desirable for instance where the solids content is relatively high and the pulp itself relatively free-settling and free-filtering, so that a relatively small cake forming zone Z–1 will suffice. Such low level operation in turn allows for the provision of ample cake spray-washing and cake drying zones Z–2 and Z–3 respectively, preceding the cake discharge zone Z–4. Following cake discharge by the scalping blade B into hopper H and conveyor C there intervenes a "dead" zone Z–5 before the start of the cake formation zone in the pulp. Flow through the filtrate discharge openings or pipes is throttled by means of the valve devices and in the manner previously described, for this zone.

When the pulp level is maintained at medium height P–2, with the sealed conveyor casing partially immersed in the pulp (see FIGURE 17) considerable active filter area is gained in an enlarged cake formation zone F–1. Consequently, the size of the "dead" zone F–5 is significantly reduced while the wash zone F–2 and the drying zone F–3 may remain unchanged or be slightly restricted. Such an operating cycle may be indicated where the nature of the pulp requires a longer filtration time or larger cake formation zone, and would be helpful in cases of pulps having relatively smaller solids content and which are relatively less freely settleable or filterable.

When the pulp level is maintained at a high elevation P–3 (see FIGURE 17) with the sealed conveyor casing fully submerged, and the hopper partially submerged, a further substantial enlargement is gained of the cake formation zone H–1, with a concurrent reduction of the "dead" zone H–5, and elimination of the cake washing zone, while accommodating a cake drying zone H–3. This mode of operation may be indicated in cases where the pulp for instance has a relatively very low solids content in the form of fines.

The filter cycle diagram in FIGURE 18 illustrates direct filtration without pre-coat and with blow-back filter cake discharge, operable with different pulp levels G–1, G–2, G–3 corresponding to those indicated in FIGURES 15, 16, 17, and with similar effects upon the sizing of a cake washing zone, a cake drying zone, and a "dead" or neutral zone of the filter cycle. In this mode of operation, the blow-back is timed to cause slabs K of filter cake to be dislodged sequentially from the filter panels into the hopper.

Operation of the precoat filter unit of FIGURE 1 is carried out with the slide shoe 43 in the FIGURE 10 position for throttling the "dead" zone of the operating cycle in the manner previously set forth, and with the scalping mechanism steadily removing filter cake along with some of the precoat material (see FIGURES 15, 16, 17). This operation must be interrupted periodically for restoring the precoat layer to its original thickness, or to replace it altogether with a layer of fresh precoat material such as diatomaceous earth or the like.

Depending upon conditions such as the nature of the pulp, the character of the filtration cycle, and the speed of rotation of the filter drum, several such interruptions may be required in a day. Accordingly, when limit switch 115 stops the progress of the scalping blade, the pulp supply into the filter drum is interrupted. The filter itself continues to operate under gas pressure and/or vacuum, until all filtrate liquor which may be valuable as well as perishable, from the residual body of pulp shall have been displaced and saved.

Only a fairly dry residual layer of precoat material along with some pulp solids is then left upon the filter media, which may have to be removed entirely before precoat replacement is initiated. For that purpose, with the scalping blade retracted, and gas pressure and/or vacuum replaced by atmospheric pressure in the drum, the shoe 43 is shifted to the FIGURE 10 position in order that back-blow air may be admitted through the hollow stem 44 and port 56 for dislodging the residual pre-coat material and removal by the conveyor mechanism.

The filter media may then be flushed and cleansed by suitable spray pipe systems carried by the hopper but not shown With the scalping blade still retracted but with the slide shoe 43 restored to its FIG. 11 position, a suspension of the pre-coat material is then fed through pipe C (see FIG. 14) into the rotating drum, while maintaining conditions such as gas pressure and/or vacuum and the pulp level, adequate for causing the formation of a pre-coat layer of uniform desired thickness on the filter media.

After the supply of this suspension has been stopped, the filter continues to operate again until all the filtrate liquor from the residual body of the suspension shall have been drawn off. This leaves upon the filter media only a relatively dry fresh thickness of the pre-coat material. An initial layer of this material may be scalped off by the blade to insure uniformity of thickness of pre-coat layer, before admitting pulp to resume filter operations proper.

In summary, this invention provides a compact filter unit having the basic advantages of internal gravity-assisted vertical downward cake discharge, yet operable at deep submergence, with a drum internally readily pressurized or non-pressurized, operable when vacuum alone or pressure alone or with a combination of both, with or without pre-coat application, and with a variety of filtration cycles. The internal pre-coat operation of this invention avoids the operational burden and the losses such as incurred in the "external" pre-coat operated drum filters due to the residual pulp or "heel" portion in the filter tank. Also, previous rotary drum filters by comparison are limited as to attainable submergence levels and feasibility of pressurization.

It will be understood that each of the elements or two or more together, of the apparatus herein described, may also find useful application in rotary drum filters differing from the type described above.

Furthermore, while the invention has been illustrated and described as embodied in an "internal" type rotary drum filter, it is not intended to be limited to the details shown since various modifications and structural as well as functional changes may be made without departing from the spirit of the present invention.

I claim:
1. In a rotary drum filter the combination which comprises a drum rotatable about a horizontal axis, having a cylindrical body portion externally supported for rotation and provided with a flange at one end and with a closure wall at the other end, said end closure wall having a hub portion concentric with the drum axis,
 an assembly of filter panels provided upon the interior face of said cylindrical body portion, said panels arranged side by side so as to occupy the interior periphery of said body portion, and adapted to have filter cake formed thereon from a body of pulp maintainable in the drum;
 a cover member detachably fastened to the flanged end of said cylindrical body portion in fluid-tight connections therewith, and having a circular central opening;
 means for rotating the assembly of said drum and cover member;
 a horizontally elongated stationary discharge conduit for filter cake, extending through said opening in the cover member;
 a stationary annular member sealing surrounding said stationary cake discharge conduit fixed thereto adjacent to said cover member for closing the opening thereof;
 means to seal the interior of the drum from the exterior thereof to provide a pressure above atmosphere in said drum including an annular sealing means concentric with the drum axis, constructed and arranged so as to provide a fluid-tight seal effective between said stationary annular member and the adjacent annular portion of the cover member rotating with said drum;
 support means for said cake discharge conduit and said annular member maintaining said conduit and member stationary in predetermined relationship to said drum;
 a hopper structure in the drum supported by and connected to said discharge conduit, and arranged for receiving filter cake from the filter panels passing over said hopper structure in the rotation of the drum, said hopper structure extending upwardly from said discharge conduit to an elevation above the pulp level in the drum;
 conveying means for moving said filter cake from the hopper structure through said discharge conduit from the drum;
 feed conduit means extending through said stationary annular member for introducing feed pulp into the interior of the drum for filtration and against gas pressure maintained in the interior of the drum;
 a set of filtrate discharge conduits located adjacent to said end closure wall and converging from the adjacent ends of the filter panels and terminating in the hub portion of said end closure wall for discharge of the filtrate liquid therethrough;
 a gas pressure supply conduit extending through said annular member in sealing relationship therewith for pressurizing the interior of the drum; and
 closure means associated with said cake discharge conduit for containing the pressure in said drum while discharging cake material into the atmosphere.

2. The combination according to claim 1, wherein said support means for the cake discharge conduit comprise first bearing means in the form of a stuffing box effective between said conduit and said cover member; and
 second bearing means for supporting the inner end of said cake discharge conduit in said hub portion of the end closure wall.

3. The combination according to claim 1, with the addition of a trunnion valve cooperating with said hub portions of the drum in controlling the filtration cycle,
 a pressurized filtrate receiver connected to the trunnion valve, and operable to maintain a filtration pressure differential, and
 a stuffing box formed partially by said hub portion and partially by said trunnion valve, for containing the receiver pressure and maintaining said pressure differential.

4. The combination according to claim 1, wherein said annular sealing means are provided by a stuffing box having an inner part formed by said stationary annular member and having an outer surrounding part formed by said cover member, and having an annular gland member cooperating with said inner and outer parts, and located outwardly from said cover member.

5. The combination according to claim 1, wherein said annular sealing means are in the form of a stuffing box having an inner cylindrical part formed by said stationary annular member, and having an outer surrounding cylindrical part formed by said cover member, and having an annular gland member cooperating with said inner and outer parts, located outwardly from the cover member, and wherein said support means for said cake discharge conduit comprise a bearing provided by said gland member cooperating with said annular member.

6. The combination according to claim 1, with the addition of
 a pressurized filtrate receiver operatively connected to said filtrate discharge pipes.

7. The combination according to claim 1, wherein said means for rotatably supporting said assembly of drum and cover member comprises a pair of annular tracks provided on said drum, spaced axially apart concentric with the drum axis,
 a set of support rollers for each track, and
 drive means for the drum, comprising an annular sprocket surrounding said hub portion adjacent to said end closure wall of the drum, and means for mounting said sprocket on said wall.

8. The combination according to claim 1, wherein said cake moving means comprise a conveyer screw operating in said discharge conduit.

9. The combination according to claim 1,
 wherein said cake moving means comprise a conveyer screw in said discharge conduit with bearings for the shaft of the screw provided in the ends of the conduit, and
 the bearing in the outer end of the conveyer shaft is in the form of a stuffing box.

10. The combination according to claim 1, wherein said support means for said cake discharge conduit comprise an inner end bearing in said hub portion of the drum, and said cake moving means comprise a conveyer screw operating in said conduit, said screw having a hollow shaft mounted for rotation in the ends of said discharge conduit, the bearing at the inner end of the shaft communicating with the hollow in said shaft, and wherein a gas pressure supply is connected to the outer end of said hollow shaft and effective to purge said inner end bearing in the hub portion of the drum.

11. The combination according to claim 1, wherein said filtrate discharge pipes are located inside the drum and in a space provided between said filter panels and said end closure wall of the drum.

12. The combination according to claim 1, wherein said annular sealing means comprise a stuffing box formed partly by a portion of said annular member and partly by an adjacent surrounding part of the cover member, and having a gland member located outwardly from said cover member, wherein said support means for said cake discharge conduit comprise a bearing provided by said gland member cooperating with said annular member, and wherein retainer means are detachably fastened to the cover member interiorly of the drum, said retainer means engaging said annular member in such a manner as to prevent any substantial axial displacement of said cake discharge conduit relative to the drum.

13. The combination according to claim 1, with the addition of a probe extending through said annular member for determining and maintaining a pre-determined pulp level in the drum.

14. In a rotary drum filter the combination which comprises:

a drum rotatable about a horizontal axis, having a cylindrical body portion provided with a flange at one end and with a closure wall at the other end, said end closure wall having a hub portion concentric with the drum axis, an assembly of filter panels provided upon the interior face of said cylindrical body portion, arranged side by side so as to occupy the interior periphery of said body portion, and adapted to have filter cake formed thereon from a body of pulp maintainable in the drum, a closure member detachably fastened to the flanged end of said cylindrical body portion in fluid tight connection therewith, and having a central opening, means for rotatably supporting the assembly of said drum and closure member, a horizontally elongated stationary tubular conveyer casing for discharging filter cake, extending through said opening in the closure member concentric with the drum axis, with a conveyer screw concentrically mounted for rotation in said casing, an annular member sealingly surrounding said stationary conveyer casing fixed thereto, and located adjacent to said cover member, a stuffing box having an inner cylindrical part formed by said annular member, and having an outer surrounding cylindrical part formed by the cover member, and having a gland member located outwardly from the cover member, said gland member providing a support bearing for said inner cylindrical part of the stuffing box, thereby supporting said tubular conveyer casing and the conveyer screw concentric with the drum axis, an inner end bearing associated with said hub portion of said end closure wall for supporting the inner end of the tubular conveyer casing concentric with the drum axis, a hopper structure supported by and connected to said conveyer casing, and arranged for receiving filter cake from the filter panels passing over said hopper structure in the rotation of the drum, said hopper structure extending upwardly from said conveyer casing to an elevation above any potential pulp level in the drum, feed conduit means extending through said annular member for introducing feed pulp into the interior of the drum for filtration, and a set of filtrate discharge pipes located adjacent to said end closure wall, and converging from the adjacent ends of the filter panels to said hub portion for discharge therethrough, a trunnion valve cooperatively associated with said hub portion and communicating with said filtrate pipes in the course of drum rotation, while controlling a filtration cycle including the delivery of filtrate liquid through said valve.

15. The combination according to claim 14, wherein said conveyor screw has a hollow shaft, providing a conduit leading from the outer end of the shaft to said inner end bearing, and means for supplying gas pressure to said conduit at its outer end, effective to purge said inner end bearing.

16. In a rotary drum filter the combination which comprises:

a drum rotatable about a horizontal axis, having a cylindrical body portion provided with a flange at one end with a closure wall at the other end, said end closure wall having a hub portion concentric with the drum axis, an assembly of filter panels provided upon the interior face of said cylindrical body portion, said panels arranged side by side so as to occupy the interior periphery of said body portion, and adapted to have filter cake formed thereon from a body of pulp maintained in the drum, a closure member detachably fastened to the flanged end of said cylindrical body portion in fluid-tight connection therewith, and having a central opening, means for rotatably supporting the assembly of said drum and end closure member, a horizontally elongate stationary discharge conduit for filter cake, extending through said opening in the closure member, support means for said cake discharge conduit, maintaining said conduit stationary in predetermined relationship to said drum, a hopper structure supported by and connected to said discharge conduit, and arranged for receiving filter cake from the filter panels passing over said hopper means in the rotation of the drum, said hopper structure extending upwardly from said discharge conduit to an elevation above any potential pulp level in the drum, means for moving said filter cake from the hopper structure through said discharge conduit from the drum, feed conduit means extending through said annular member for introducing feed pulp into the interior of the drum for filtration, a set of filtrate discharge pipes located adjacent to said end closure wall and converging from the adjacent ends of the filter panels towards the drum axis, and terminating in the hub portion of said end closure wall for discharging the filtrate liquid therethrough, a filter cake scalping device located within the drum, which comprises a scalping blade member having a horizontal scalping edge, means for supporting said blade member on said hopper structure, for movement towards and away from the filter media on the drum, and actuating mechanism extending through said central opening and operable for moving said blade member towards and away from said filter media, said actuating mechanism comprising means whereby the movement of said scalping blade member is geared to the rotation of the drum causing the blade member to be moved in proportion to the rotation of the drum.

17. The combination according to claim 16, wherein said drum is supported for rotation by means of rollers rotated by the drum, with the addition of actuating mechanism whereby said actuating shaft is geared to the rotation of said supporting rollers.

18. The combination according to claim 16, wherein said scalping member is mounted upon a counter-shaft turnably supported on said hopper structure, and wherein said actuating mechanism comprises an actuating shaft extending through said central opening parallel to said counter-shaft and to the drum axis, and a pair of lever arms mounted upon said actuating shaft and said counter-shaft, and cooperating in such a manner that turning said actuating shaft in one direction will move said blade member towards the filter media, while turning said shaft in the opposite direction will move the blade member away from said filter media.

19. The combination according to claim 18, with the addition of an annular member sealingly surrounding said stationary cake discharge conduit fixed thereto adjacent to said closure member of the drum, annular sealing means concentric with the drum axis, constructed and arranged so as to provide a fluid tight seal between said stationary annular member and the adjacent annular portions of said closure member, a conduit extending through said stationary annular member for introducing a pressurizing gas into the interior of the drum, closure means associated with said cake discharge conduit for containing the pressure in the drum, and wherein said actuating shaft extends through said annular member in sealing relationship therewith.

20. The combination according to claim 16, with the addition of actuating mechanism which comprises a reducing gear unit having an input shaft geared to the rotation of the drum, and having an output shaft, a screw spindle, a universal joint connecting one end of the spindle with said output shaft, a nut member threaded upon the other end of the spindle, an arm fixed upon said actuating shaft, and a swivel connection supporting said nut member upon the outer end of said arm so that said spindle together with said nut member and said arm are located substantially in an operating plane extending transversely of said actuating shaft, and that the rotation of said output shaft and spindle and actuating shaft will actuate the scalping device within the drum.

21. The combination according to claim 20, wherein said drum is supported for rotation by means of rollers, and wherein said input shaft is geared directly to the rotation of the rollers.

22. The combination according to claim 16, wherein the end closure wall of the drum is formed with a cylindrical hub having an outer open end and an inner closed end, and having its interior connected to said filtrate discharge pipes of the drum, and valve means located in said hub and movable relative to the adjacent terminal openings of said pipes, with the addition of valve actuating means operable for at least partially throttling the flow of filtrate liquid through a pre-determined number of said pipes, corresponding to a dead zone of the filtration cycle.

23. The combination according to claim 22, wherein said valve means comprise an arcuate shoe having an outer arcuate surface conforming to the inner cylindrical surface of said hub, and wherein said actuating means comprise elements operable for shifting said shoe coaxial with the drum axis on said inner cylindrical surface and relative to the terminal openings of said pipes, for throttling the flow of filtrate liquid therethrough.

24. The combination according to claim 23, wherein a stationary filtrate discharge duct is provided in axial alignment with said hub, together with a stuffing box surrounding said hub and duct, wherein said valve actuating means comprise an actuating rod connected to said shoe concentric with the drum axis, and extending through the wall of said stationary filtrate discharge duct in sealing relationship therewith, and operable for axially shifting said shoe, as well as turnable about said axis for angularly moving said shoe.

25. The combination according to claim 23, wherein said shoe has a radially directed port terminating in said arcuate outer surface of said shoe, and so located and arranged relative to said surface that said port is out of communication with said terminal openings when said shoe is in a position partially closing said pre-determined discharge openings, and that said shoe is axially shiftable to a position where said port communicates sequentially with said terminal openings incident to the rotation of the drum, and wherein controllable gas pressure supply means are connected to said port for supplying back-blow to said port and sequentially into said filtrate discharge pipes.

26. The combination according to claim 23, with the addition of means for altering the effective arcuate length of said shoe, relative to the elevation of the pulp level to be maintained within the drum.

27. The combination according to claim 23, with the addition of a stationary filtrate duct axially aligned with said hub, a stuffing box surrounding said hub and duct, an actuating rod connected to said shoe concentric with the drum axis, and extending through the wall of said stationary duct in sealing relationship therewith, and operable for axially adjustably shifting said shoe, which shoe comprises a hub portion fixed to said rod, and an arcuate shoe portion detachably connected to said hub portion.

28. The combination according to claim 23, wherein said shoe has a radial upwardly directed port terminating in said arcuate surface, and so located and arranged relative to said surface that said port is out of communication with said terminal openings when said shoe is in a position partially closing said pre-determined number of openings, and that said shoe is axially shiftable to a position where said port communicates sequentially with said terminal openings incident to the rotation of the drum, with the addition of a stationary filtrate discharge duct of angular shape having a horizontal shank axially aligned with said hub, a stuffing box surrounding said shank and said hub, a hollow tubular stem fixed to said shoe horizontally coaxial therewith and communicating with said port and penetrating the wall of said duct in sealing relationship therewith, said stem and shoe being axially adjustably shiftable between said positions, and controllable gas pressure supply means connected to the outer end of said hollow stem to supply back-blow through said radial port sequentially into said filtrate discharge conduits.

29. In a rotary drum filter the combination which comprises a filter drum rotatable about a horizontal axis, and having filter panels coextensive with the drum axis arranged side by side in a circle, said drum being formed with a cylindrical hub having an outer open end and an inner closed end, a set of filtrate discharge conduits connecting the interior of said hub with the adjacent ends of the filtrate chambers of the panels, valve means located in said hub, comprising a shoe having an arcuate outer surface conforming to the inner cylindrical surface of said hub, and movable relative to the adjacent terminal openings of a predetermined number of said conduits, corresponding to a dead zone of the filtration cycle, first actuating means for shifting said shoe coaxial with the drum axis for at least partially closing said terminal openings, a scalping blade member having a horizontal scalping edge, means for supporting said blade member for movement towards and away from the filter media of the drum, and second actuating means for moving said blade member towards and away from the filter media of the drum.

30. The combination according to claim 29, wherein said shoe is turnable about the drum axis.

31. The combination according to claim 29, with the addition of a stationary filtrate discharge duct axially aligned with said hub, and a stuffing box surrounding said hub and duct, and wherein said first actuating means comprise a shaft connected to said shoe coaxial with the drum axis, said shaft extending through the wall of said stationary duct in sealing relationship therewith, and operable for axially adjustably shifting said shoe.

32. The combination according to claim 29, wherein said shoe has a radial port terminating in said arcuate outer surface, and so located that said port is normally out of communication with said terminal openings when said shoe is shifted in one direction to a position at least partly closing said terminal openings, but that when the shoe is shifted in the opposite direction said port communicates sequentially with said terminal openings incident to the rotation of the drum, and wherein controllable gas pressure supply means are provided connected to the inner end of said radial port for supplying back blow pressure through said port sequentially into said filtrate discharge conduits.

33. The combination according to claim 29, with the addition of means for altering the effective arcuate length of said outer surface of said shoe in keeping with a change of pulp level elevation in the drum.

34. The combination according to claim 29, with the addition of a stationary filtrate duct axially aligned with said hub, a stuffing box surrounding said hub and duct, an actuating rod connected to said shoe concentric with the drum axis, and extending through the wall of said stationary duct in sealing relationship therewith, and axially movable for shifting said shoe, which shoe comprises a hub portion fixed to said rod, and an arcuate shoe portion detachably connected to said hub portion.

35. The combination according to claim 29, with the addition of a stationary filtrate discharge duct of angular shape having a horizontal shank axially aligned with said hub, and of a stuffing box surrounding said shank and said hub, and wherein said shoe has a radial upwardly directed port terminating in said arcuate surface, and so located relative to said surface that the port is normally out of communication with said terminal openings when said shoe is shifted in one direction to a position partially closing said terminal openings, but that when the shoe is shifted in the opposite direction said port communicates sequentially with said terminal openings incident to the rotation of the drum, and said actuating means comprise a hollow tubular stem fixed to said shoe horizontally coaxial therewith and communicating with said port, and penetrating the wall of said duct in sealing relationship therewith, said stem and shoe being axially adjustably shiftable between said positions, and wherein controllable gas pressure supply means are provided with a connection to the outer end of said hollow stem for applying back blow through said radial port sequentially into said filtrate discharge conduits.

36. The combination according to claim 29, with the addition of a stationary filtrate discharge duct axially aligned with said hub, and a stuffing box surrounding said hub and duct, and wherein said valve means comprise a shoe having an arcuate surface conforming to the inner cylindrical surface of said hub, and wherein said actuating means comprise a rod fixed to said shoe coaxial with the drum axis, and extending through the wall of said stationary duct in sealing relationship therewith, inner bearing means for supporting the inner end of the rod in the inner closed end of the hub, and outer bearing means for supporting the outer end of the rod in said wall of the stationary duct, said rod and shoe being axially shiftable relative to said terminal openings, guided by said inner and outer bearing means.

37. In a rotary drum filter, the combination which comprises a filter drum rotatable about a horizontal axis, and having filter panels coextensive with the drum axis, arranged side by side in a circle, said drum being formed with a cylindrical hub having an outer end and an inner closed end, a set of filtrate discharge conduits connecting the interior of said hub with the adjacent ends of the filtrate chambers of said panels, valve means located in said hub, comprising a shoe having an arcuate outer surface conforming to the inner cylindrical surface of said hub, said shoe having a radial port terminating in said arcuate outer surface, and controllable gas pressure supply means connected to the inner end of said radial port for supplying back blow pressure through said port sequentially into said filtrate discharge conduits.

38. The combination according to claim 37, with the addition of a stationary filtrate discharge duct axially aligned with said hub, and a stuffing box surrounding said hub and said duct, a hollow shaft concentric with the drum axis, and having its inner end connected to said shoe, and communicating with said radial port, said hollow shaft extending through the wall of said stationary discharge duct, and controllable gas pressure supply means connected to the outer end of said hollow shaft for supplying back blow pressure through said port sequentially into said filtrate discharge conduits.

39. In a rotary drum filter the combination which comprises a drum rotatable about a horizontal axis, having a cylindrical body portion provided with a flange at one end and with a closure wall at the other end, said end closure wall having a hub portion concentric with the drum axis, an assembly of filter panels provided upon the interior face of said cylindrical body portions, arranged side by side so as to occupy the interior periphery of said body portion, and adapted to have filter cake formed thereon from a body of pulp maintainable in the drum, a cover member detachably fastened fluid tight to the flanged end of said cylindrical body portion and having a central opening, a horizontal stationary tubular conduit for receiving and discharging filter cake, extending through said central opening concentric with the drum axis, a hopper structure supported by and connected to said discharge conduit for receiving filter cake from the filter panels passing over said hopper structure in the rotation of the drum, an internal bearing supporting the rear end of said tubular conduit in said hub portion, support means for the opposite end of said tubular conduit, a conveyor screw operating in said conduit, said screw having a hollow shaft mounted for rotation in the ends of said discharge conduit, the bearing at the inner end of the shaft communicating with the hollow in said shaft, gas pressure supply means connected to the outer end of said hollow shaft, and effective to purge said inner end bearing in the hub portion of the drum, and means for rotatably supporting the assembly of said drum and cover member concentric with said tubular conduit and said conveyor screw.

40. A rotary drum pressure filter comprising in combination a fluid-tight pressure drum rotatable about a horizontal axis, having a cylindrical body portion open at one end with a closure wall at the other end, a filter medium mounted upon the interior peripheral face of said cylindrical body portion in spaced relation thereto to provide space between the medium and said face, and adapted to have filter cake formed on the inner face of the medium from a pool of pulp maintained within the drum, a plurality of peripherally spaced axially extending dividers dividing said space into a plurality of drainage spaces, a cover member fastened to the open end of the drum in fluid-tight connection therewith, and having a circular opening coaxial with the axis of rotation of the drum, means for rotatably supporting said drum, a stationary discharge conduit for filter cake, extending through said opening in the cover member, a stationary annular closure member in fluid-tight engagement with said conduit and the periphery of said opening while permitting rotation of the cover member, stationary support means for said cake discharge conduit and said annular member, a stationary hopper in the drum connected to said discharge conduit, and arranged for receiving filter cake from the filter medium passing over said hopper during rotation of the drum, said hopper extending upwardly from said discharge conduit to an elevation above the level of the pulp pool, means for moving said filter cake from the hopper structure through said discharge conduit from the drum while maintaining the pressure therein, feed conduit means arranged to introduce feed pulp into the interior of the drum in fluid sealed relation thereto for filtration, a set of filtrate discharge conduits extending from the drainage spaces to the exterior of said drum in fluid sealed relation thereto, a gas pressure supply conduit communicating with the interior of the drum to pressurize the same, and vacuum supply means operatively communicating with said filtrate discharge conduits.

References Cited

UNITED STATES PATENTS

| | | | |
|---|---|---|---|
| 1,531,482 | 3/1925 | Haug | 210—407 X |
| 1,848,445 | 3/1932 | Vallez | 210—395 X |
| 1,870,387 | 8/1932 | Shimmin | 210—407 X |
| 1,870,442 | 8/1932 | Coley | 210—395 X |
| 2,530,503 | 11/1950 | Bonham | 18—12 |
| 2,963,158 | 12/1960 | Jung | 210—86 |
| 3,080,064 | 3/1963 | Glesse | 210—407 X |
| 3,229,815 | 1/1966 | Mathewson | 210—394 X |
| 3,363,774 | 1/1968 | Luthi | 210—404 |

REUBEN FRIEDMAN, Primary Examiner

T. A. GRANGER, Assistant Examiner

U.S. Cl. X.R.

210—394, 403, 416